United States Patent Office 2,984,962
Patented May 23, 1961

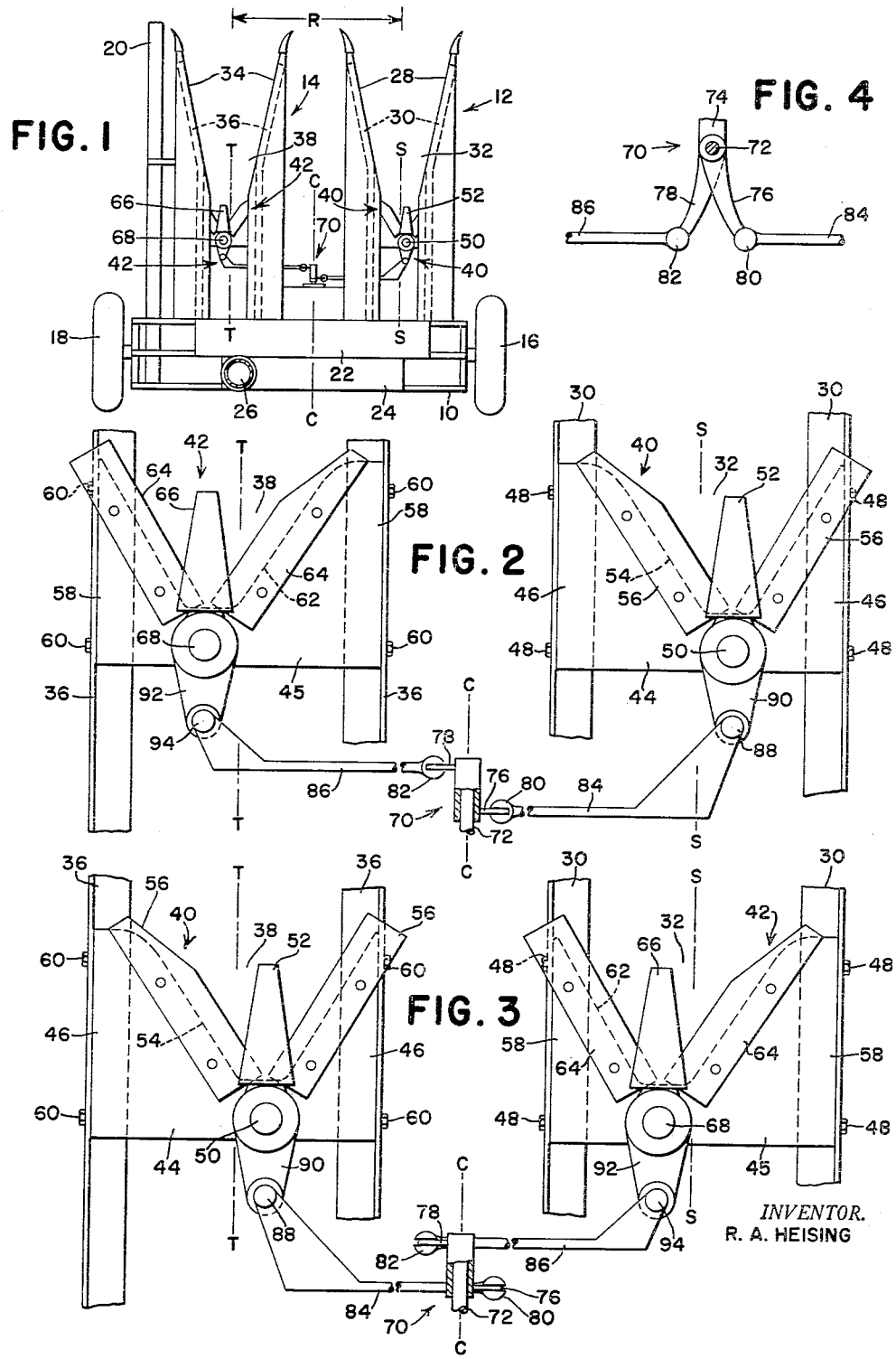

2,984,962
INTERCHANGEABLE CUTTER DEVICES FOR ROW-CROP HARVESTER

Robert A. Heising, Ottumwa, Iowa, assignor to Deere & Company, Moline, Ill., a corporation of Delaware Filed May 6, 1959, Ser. No. 811,469

6 Claims. (Cl. 56—102)

This invention relates to a row-crop harvester and more particularly to means for enabling variation between the positions of cutter devices in two or more row units.

A typical row-crop harvester of the character having two or more row units is designed to operate over a field in which stalk crops are planted in rows spaced uniformly apart. In the forage type machine, each row unit is equipped with a cutter device for severing the stalks near the ground, as distinguished from a typical corn picker in which the ears are simply snapped from the stalks and normally no effort is made to sever the stalks as indicated. Spacing between rows may vary from field to field, and the spacing at times may vary between row widths of thirty or forty inches. This of course presents some problems in the harvesting of the crops, because a machine set for one row spacing is not necessarily able to handle different row spacings, especially where the difference is substantial. Normally however, the gathering points on a row unit are sufficiently widely spaced and otherwise constructed and shaped to guide the standing stalks into the throat or stalk-receiving passageway, and adequate harvesting jobs can be performed under most conditions. However, experience has shown that if some range of adjustability is provided, the harvesting operation can be improved. Machines are known in which the row units themselves can be laterally adjusted to accommodate varying row spacings, but machines of this character are relatively expensive and complicated. It has been found, according to the present invention, that the harvesting operation can be improved if the cutter devices are adjusted laterally without disturbing the row units, whereby the cutter devices themselves have a plurality of different positions accommodating row widths throughout a range of say thirty to forty inches. It is therefore the principal object of the present invention to provide improved cutter devices and mounting means therefor in row-unit harvesters. The invention features interchangeable cutter devices which are symmetrically designed and capable of interchangeability from one row unit to the other so than in one position one cutter device is capable of handling a variety of row widths at the top of the spacing range and, when changed to the other unit, will afford a narrower spacing capable of handling row spacings at the bottom of the maximum range. It is an object of the invention to provide such construction as may be embodied in harvesters without undue complications and expense. It is a further feature of the invention to enable interchangeability of the cutter devices without requiring complicated revisions in the driving mechanism.

The foregoing and other important objects and desirable features inherent in and encompassed by the invention will become apparent from the following description of a preferred embodiment of the invention as illustrated in the accompanying sheet of drawings, the figures of which are described immediately below.

Fig. 1 is a reduced-scale plan of a typical harvest of the two-row type.

Fig. 2 is an enlarged view, with portions broken away, showing one setting of the cutter devices.

Fig. 3 is a similar view showing the cutter devices interchanged to occupy another position.

Fig. 4 is a fragmentary elevation, partly in section, showing an intermediate portion of the drive means.

The typical harvester chosen for purposes of illustration is of the two-row type having a mobile frame 10 carrying first and second or right and left hand row units 12 and 14 respectively. The row units are rigidly mounted on the frame in fixed relationship so as to have a lateral spacing corresponding generally to a row width represented here by the dimension R. The frame is carried on right and left hand wheels 16 and 18 and has a forwardly extending tongue 20 by means of which the harvester may be connected to a tractor or the like (not shown) for advance over the field of row-planted crops. The rear part of the frame carries suitable crop-receiving means 22 including a blower or equivalent means, as at 24, provided with a discharge spout 26 of typical construction. The basic details of the machine in this respect may be altered and do not limit the invention.

The row unit 12 includes inner and outer gatherer members 28 supported at least in part on a pair of fore-and-aft support members 30. The members are spaced apart laterally to afford or define a fore-and-aft stalk-receiving passageway 32, generally centered on the right hand row, it being noted that the members 28 diverge forwardly so as to accommodate crops in wider rows or crops that may for one reason or another be out of line with the row on which the machine is operating. The left hand unit 14 is of similar or identical construction, having gatherer members 34, support members 36 and including a fore-and-aft stalk-receiving passageway 38. As will be seen, the lateral spacing of the members 30 corresponds to the lateral spacing between the members 36. Further, the members 30, 30 and the members 36, 36 are equidistant from the longitudinal center line of the machine, here represented by the line C—C. The center line of the stalk-receiving passageway is represented by the line S—S, and the line T—T represents the center line of the other stalk passageway 38.

The right hand row unit 12 includes a cutter device, indicated in its entirety by the numeral 40 and a similar cutter device 42 is disposed in the other row unit 14. It will be noted from Fig. 1 that the cutter devices 40 and 42 are not centered respectively on the fore-and-aft center lines of the stalk passageways 32 and 38. However, because of the forwardly diverging portions of the gatherer members 28 and 34, a reasonably adequate job of cutting stalks may be accomplished with the slight lateral offset noted, particularly on row widths equal to or somewhat in excess of the dimension R. However, when row widths fall below the dimension R it is desirable that the cutter devices be moved inwardly. This is the theory of the present invention and for that purpose the cutter devices have novel and peculiar design features enabling interchangeability of the device 40 to the row unit 14 and vice versa.

The devices 40 and 42 respectively include bases or supports 44 and 45. These are symmetrical as respects each other and, according to the preferred embodiment shown, each base has a width corresponding to the lateral spacing of the associated support members 30, 30 or 36, 36. With reference to the right hand base or support 44, it will be noted that this has lateral side portions 46 which are engageable respectively with the members 30. Any form of removable securing means may be utilized, cap screws being shown here at 48. The base 44 thus bridges the stalk passageway 32 and carries thereon, intermediate the portions 46, 46, an upright pivot 50 for mounting an oscillating knife 52. The base or support is forwardly notched at 54 and carries a pair of fixed blades 56 in forwardly diverging relation. The oscillating knife 52 swings back and forth across the notch defined by the edges of the fixed blade 56 and severs stalks closely above the ground as the stalks are received in the stalk passageway 32. In the arrangement shown in Figs. 1 and 2, the V or notch between the blades 56 is laterally offset to the right of the passageway center line S—S. The pivot 50 is likewise laterally offset to the outer or right side of this center line.

As previously stated, the left hand cutter device 42 is similarly constructed. However, it is symmetrical as respects the center line C—C of the machine and as respects the normal position of the cutter device 40 as shown in Fig. 2. The support 45, like the support 44, has opposite edge portions 58 engageable respectively with the members 36, 36 and removably secured thereto as by cap screws 60. The support 45 has a forwardly diverging notch 62 along the edges of which are mounted fixed blades 64 cooperative with an oscillating knife 66 mounted on the support 45 via an upright knife pivot 68. This pivot, although lying intermediate the portions 58, is laterally offset so as to lie to the left of the stalk passageway center line T—T. In other words its lateral offset is to the side opposite to the lateral offset of the knife pivot 50 in the right hand cutter device 40. However, as in the case of the right hand device 40, the oscillating knife 66 can accommodate stalks falling on the center line T—T or to the left thereof. In other words, assuming that the dimension R represents a row spacing of thirty-eight inches, the relationship shown in Figs. 1 and 2 can accommodate thirty-six, thirty-eight and forty inch rows. In the instances of narrower rows, such as thirty inches, thirty-two inches and thirty-four inches, the cutter devices can be interchanged as in Fig. 3, the details of which will be covered below.

When it is desired to interchange the cutter devices 40 and 42 from their respective positions of Fig. 2 to those of Fig. 3, the cap screws 48 and 60 are removed to free the supports 44 and 45. These supports are then interchanged between the row units without reversal thereof. Because of the lateral offset of the respective knife pivots 50, 68, the interchange of the cutter devices will change the lateral offset between the pivots and the respective passageway center lines S—S and T—T. In Fig. 3, it will be noted that the knife pivots are inwardly of the respective passageway centerlines, and thus the lateral spacing between the pivots 50 and 68 is narrower than that of Fig. 2. Stated otherwise, the lateral distance between the knife pivots 50 and 68 is different from the lateral distance between the stalk passageway centerlines S—S and T—T, being in this case wider, and in Fig. 3, the distance between the knife pivots is still different from that between the passageway center lines but in this case is narrower. Since the support members 30, 30 and 36, 36 are similar and since the supports are similar from edge to edge, as respects their respective portions 46, 46 and 58, 58, the interchange is readily accomplished, and the same cap screws 48 and 60 may be used.

It is a further feature of the invention that the interchangeability of the cutter devices does not materially affect the drive means for the oscillating knives 52 and 66. For this purpose the drive means, indicated in its entirety by the numeral 70, is preferably located on the center line of the machine and includes a fore-and-aft shaft 72 having an input arm 74 which may be driven in any suitable manner for causing oscillation of the shaft. The shaft further includes a pair of depending and downwardly diverging arms 76 and 78, the free ends of which respectively afford detachable articulate connections 80 and 82, respectively, with right and left hand links 84 and 86. In the condition of Fig. 2, the link 84 extends to the right and has its free or outer end pivotally connected at 88 to a drive arm 90 rigid with the knife 52 so that oscillation of the shaft 72 operates through the linkage 76—84—90 to swing the arm 52 back and forth in cooperative relation with the fixed blades 56. A similar connection is effected between the other link 86 and an arm 92 rigid with the other knife 66, the connection again being pivotal at 94 for obvious reasons.

On the basis of conventional construction as accommodating normally encountered row spacings, the distance between the knife pivots 50 and 68 in Figs. 1 and 2 may be regarded as thirty-eight inches. Thus, the cutter devices may accommodate row widths in two-inch increments to either side of a thirty-eight-inch spacing; namely, thirty-six inches and forty inches. The lateral offset of each knife pivot relative to the exact center line between the opposite edges of the respective support, or the amount of lateral offset between the center line of the passageway is, on the basis of the dimensions encountered, one and one-half inches, so that the difference between the spacing of the knife pivots in Fig. 2 and that in Fig. 3 is three inches. In order to utilize the same driving mechanism with only minor changes therein, the distance between the centers of the ball and socket connections 80 and 82 is also three inches. Thus, when the interchange of the devices is made as between Figs. 2 and 3, the left hand drive link 86 may still be used to drive the left hand cutter device, which, in Fig. 3, becomes the right hand cutter device, and vice versa. It is simply a matter of crossing the links 84 and 86 so that the link 86 which extends to the left in Fig. 2 extends to the right in Fig. 3 and the link 84 which extends to the right in Fig. 2 extends to the left in Fig. 3.

In Fig. 3, the lateral distance between the center lines of the knife pivots 50 and 68 is, on the basis of the dimensional characteristics used here, thirty-two inches (because of the lateral difference of three inches at each side) and this relationship can readily accommodate row spacings of thirty, thirty-two and thirty-four inches.

The interchangeability of the cutter devices enables the use of a design in which it is unnecessary to bodily shift the row units, thus minimizing the cost and complication in the harvester. This proposition, as noted, is based on the conception that the shift in the cutter devices is adequate to accommodate a variety of row spacings within the range normally encountered. Obviously, the principles can be applied to situations in which the row spacings are in different ranges. Likewise, other modifications may be made in the structure disclosed, all without departing from the spirit and scope of the invention.

What is claimed is:

1. A row-crop harvester, comprising: a mobile frame; first and second row units carried by the frame in laterally spaced apart relation and each unit having laterally spaced apart members affording a fore-and-aft stalk-receiving passageway, the members in one unit being respectively similar to and having the same spacing as those in the other unit and further being symmetrically arranged in the units relative to the respective fore-and-aft centerlines of the passageways; first and second cutter devices disposed respectively in the first and second unit passageways and respectively having first and second supports and first and second similar knives, said supports being symmetrical relative to a fore-and-aft median plane midway between the passageway centerlines and each support having portions spaced apart on the order of and engaging the respective members and further having an upright knife pivot intermediate the respective portions and mounting the respective knife for movement across the respective passageway, said pivots being respectively offset laterally in equal and opposite directions from the respective passageway centerlines so that the lateral spacing between the pivots is different from that between said centerlines; first and second securing means respectively connecting the first and second supports removably to the respective members for interchangeability of the cutter devices between the units so as to change the relation of the knife pivot offsets to the passageway centerlines and thereby to produce another lateral spacing between said pivots; drive means on the frame; and drive connections removably arranged between the drive means and the knives.

2. The invention defined in claim 1, in which: the drive means includes a drive element carried by the frame substantially in said median plane and in general lateral alinement with the cutter devices, said element having a pair of arms thereon centered on said midpoint and spaced apart on the order of the lateral offset of a knife pivot and its passageway centerline; and said drive connections comprising a first link connected at one end to the first knife and detachably connected at its other end to one arm and a second link connected at one end to the second knife and detachably connected at its other end to the other arm.

3. A row-crop harvester, comprising: a mobile frame; first and second row units carried by the frame in laterally spaced apart relation and each unit having laterally spaced apart members affording a fore-and-aft stalk-receiving passageway, at least one member in each unit serving as a mounting member and said mounting members being similar and symmetrically arranged in the units relative to the respective fore-and-aft centerlines of the passageways, with one mounting member laterally spaced to one side of its passageway centerline and the other mounting member being equally laterally spaced to the opposite side of its passageway centerline; first and second cutter devices disposed respectively in the first and second unit passageways and respectively having first and second supports and first and second similar knives, said supports being symmetrical relative to a fore-and-aft median plane midway between the passageway centerlines and each support having a portion thereon engaging the respective mounting member and further having an upright knife pivot thereon and mounting the respective knife for movement across the respective passageway, said pivots being offset laterally in equal and opposite directions respectively from the respective passageway centerlines so that the lateral spacing between the pivots is different from that between said centerlines; first and second securing means respectively connecting the first and second supports removably to the respective mounting members for interchangeability of the cutter devices between the units so as to change the relation of the knife pivot offsets to the passageway centerlines and thereby to produce another lateral spacing between said pivots; drive means on the frame; and drive connections removably arranged between the drive means and the knives.

4. The invention defined in claim 3, in which: the drive means includes a drive element carried by the frame substantially in said median plane and in general lateral alinement with the cutter devices, said element having a pair of arms thereon centered on said midpoint and spaced apart on the order of the lateral offset of a knife pivot and its passageway centerline; and said drive connections comprising a first link connected at one end to the first knife and detachably connected at its other end to one arm and a second link connected at one end to the second knife and detachably connected at its other end to the other arm.

5. A row-crop harvester, comprising: a mobile frame; first and second row units carried by the frame in laterally spaced apart relation and each unit having laterally spaced apart members affording a fore-and-aft stalk-receiving passageway, at least one member in each unit serving as a mounting member and said mounting members being similar and symmetrically arranged in the units relative to the respective fore-and-aft centerlines of the passageways, with one mounting member laterally spaced to one side of its passageway centerline and the other mounting member being equally laterally spaced to the opposite side of its passageway centerline; first and second cutter devices disposed respectively in the first and second unit passageways and respectively having first and second similar supports and first and second similar knives, said supports being symmetrical relative to a fore-and-aft median plane midway between the passageway centerlines and each support having a portion thereon engaging the respective mounting member and further having knife-mounting means thereon and mounting the respective knife for movement across the respective passageway, said two knife-counting means being offset laterally in equal and opposite directions respectively from the respective passageway centerlines so that the lateral spacing between the two knife-mounting means is different from that between said centerlines; first and second securing means respectively connecting the first and second supports removably to the respective mounting members for interchangeability of the cutter devices between the units so as to change the offset relations of the two knife-mounting means to the passageway centerlines and thereby to produce another lateral spacing between said knife-mounting means; drive means on the frame; and drive connections removably arranged between the drive means and the knives.

6. A row-crop harvester, comprising: a mobile frame; first and second row units carried by the frame in laterally spaced apart relation and each unit having laterally spaced apart members affording a fore-and-aft stalk-receiving passageway, at least one member in each unit serving as a mounting member and said mounting members being similar and symmetrically arranged in the units relative to the respective fore-and-aft centerlines of the passageways, with one mounting member laterally spaced to one side of its passageway centerline and the other mounting member being equally laterally spaced to the opposite side of its passageway centerline; first and second supports respectively in the first and second unit passageways, said supports being symmetrical relative to a fore-and-aft median plane midway between said centerlines and each support having a portion thereon engaging the respective mounting member; first and second cutters carried respectively by the supports, said first cutter being operative in a cutting zone laterally offset in a predetermined amount to one side of the first unit passageway centerline and said second cutter being operative in a cutting zone laterally offset in an equal amount to the opposite side of the second unit passageway centerline so that the lateral spacing between the cutting zones is different from that between said centerlines; first and second securing means respectively connecting the first and second supports removably to the respective mounting members for interchangeability of the supports, together with their respective cutters, from one unit to the other so as to change the lateral relation of the cutting zones to the passageway centerlines and thereby to produce another lateral spacing between the cutting zones; drive means on the frame; and drive connections removably arranged between the drive means and the cutters.

References Cited in the file of this patent

UNITED STATES PATENTS

| | | |
|---|---|---|
| 965,134 | Fiebach | July 19, 1910 |
| 1,308,818 | Sproul | July 8, 1919 |